(12) United States Patent
Hung et al.

(10) Patent No.: US 8,836,887 B2
(45) Date of Patent: Sep. 16, 2014

(54) LIQUID CRYSTAL DISPLAY DEVICE

(71) Applicant: AU Optronics Corporation, Hsin-Chu (TW)

(72) Inventors: Chia-Hsing Hung, Hsin-Chu (TW); Yen-Po Yeh, Hsin-Chu (TW); Chih-Liang Pan, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 14/176,418

(22) Filed: Feb. 10, 2014

(65) Prior Publication Data

US 2014/0160375 A1    Jun. 12, 2014

Related U.S. Application Data

(62) Division of application No. 13/456,466, filed on Apr. 26, 2012, now Pat. No. 8,687,140.

(30) Foreign Application Priority Data

Aug. 10, 2011    (TW) .............................. 100128558 A

(51) Int. Cl.
*G02F 1/1333*       (2006.01)
*G06F 1/16*         (2006.01)

(52) U.S. Cl.
CPC ........ *G02F 1/133308* (2013.01); *G06F 1/1601* (2013.01); *G02F 2001/133314* (2013.01); *G02F 1/13338* (2013.01); *G02F 2001/133317* (2013.01)
USPC .......................................................... 349/58

(58) Field of Classification Search
CPC .............. G02F 1/13308; G02F 1/1338; G02F 1/13314; G02F 1/13317
USPC ....................................................... 349/12, 58
See application file for complete search history.

(56) References Cited

U.S. PATENT DOCUMENTS

| 6,411,353 | B1 | 6/2002 | Yarita et al. | |
| 7,920,225 | B2 * | 4/2011 | Nishikawa et al. | 349/60 |
| 7,924,362 | B2 * | 4/2011 | Slobodin | 349/58 |
| 7,952,682 | B1 | 5/2011 | Nagaoka et al. | |
| 8,194,202 | B2 | 6/2012 | Okuda | |
| 8,405,791 | B2 * | 3/2013 | Roh et al. | 349/58 |
| 2011/0255026 | A1 | 10/2011 | Pan et al. | |

FOREIGN PATENT DOCUMENTS

EP        1956401 A2    8/2008

* cited by examiner

*Primary Examiner* — James Dudek
(74) *Attorney, Agent, or Firm* — WPAT, PC; Justin King

(57) ABSTRACT

A liquid crystal display device includes a backlight module, a liquid crystal display panel, an insulating cover and a touch panel assembly. The insulating cover includes a reflective bottom plate for supporting the backlight module, at least one first sidewall with a first end and an opposite second end, at least one second sidewall with a third end and an opposite fourth end and a supporting plate connected to the opposite second end of the first sidewall and the third end of the second sidewall. The supporting plate is arranged in parallel with the reflective bottom plate and has an upper surface for supporting the liquid crystal display panel. The securing frame has a first end portion fixed to a lower surface of the supporting and a second end portion.

9 Claims, 6 Drawing Sheets

LIQUID CRYSTAL DISPLAY DEVICE

RELATED APPLICATIONS

This application is a divisional application of a non-provisional application Ser. No. 13/456,466, filed Apr. 26, 2012, which claims priority to Taiwan Application Serial Number 100128558, filed Aug. 10, 2011, both of which are herein incorporated by reference.

BACKGROUND

1. Field of Invention

The present invention relates to a display device. More particularly, the present invention relates to a display device with a touch control function.

2. Description of Related Art

Liquid crystal display panels have been used extensively in various electronic devices, and the tablet PC is an example of such an electronic device. The current tablet PCs are designed to be light and thin so as to be easily carried by a user. Moreover, it is necessary to integrate the touch-control function on a display screen of the tablet PC.

FIG. 6 is a cross-sectional view of a conventional liquid crystal display device equipped with a touch panel assembly. The display device includes a touch panel assembly 500 and a liquid crystal display module.

The touch panel assembly 500 includes a touch panel 520, a protective substrate 530 and a rim frame 510. The touch panel 520 is located on an inner surface of the protective substrate 530 and the rim frame 510 is located on a periphery of the protective substrate 530 to be fastened to the liquid crystal display module. The liquid crystal display device further includes a back bezel 910, a plastic frame 920, and a front bezel 930 for securing all members of the liquid crystal display device.

A reflective plate 800, a light guide plate 260 and a plurality of optical films 270, e.g., brightness enhanced films or diffusing films, are stacked sequentially on the back bezel 910. The plastic frame 920 supports a liquid crystal display panel 250 thereon, and the optical elements inside the back bezel 910 engage the back bezel 910 by a clip mechanism. After the liquid crystal display panel 250 is assembled within the plastic frame 920, the front bezel 930 is arranged above and covered over the liquid crystal display panel 250 and connected to the plastic frame 920 by the clip mechanism. There is an opening located on one or more sides of the plastic frame 920 so that an edge-type light source can be installed in proximity to the plastic frame 920 to provide illumination to the light guide plate 260.

In order to assemble the conventional touch panel assembly 500 and the liquid crystal display module, one or more screws 940 are required to fasten the front bezel 930 to the rim frame 510. Thus, the thickness of the final product depends on the combined thickness of the rim frame 510, the protective substrate 530 and the liquid crystal display module. There is a strong need for providing light and thin liquid crystal display devices for customers.

SUMMARY

The present invention is directed to a liquid crystal display device which is configured in such a manner as to satisfy abovementioned need for providing a light and thin display device.

According an aspect of the present invention, the liquid crystal display device includes a backlight module, a liquid crystal display panel, an insulating cover, touch panel assembly and a securing frame. The insulating cover includes a reflective bottom plate, at least one first sidewall, at least one second sidewall and a supporting plate. The reflective bottom plate supports the backlight module. The first sidewall has a first end connected with a periphery of the reflective bottom plate and an opposite second end, and the first sidewall is perpendicular to the reflective bottom plate. The second sidewall has a third end and an opposite fourth end, and the second sidewall is perpendicular to the supporting plate. The supporting plate is interconnected between the opposite second end of the first sidewall and the third end of the second sidewall. The supporting plate is arranged in parallel with the reflective bottom plate and has an upper surface for supporting the liquid crystal display panel. The touch panel assembly covers and is disposed above the liquid crystal display panel. The securing frame has a first end portion and a second end portion. The first end portion is fixed to a lower surface of the supporting plate and the second end portion is connected to the touch panel assembly.

According to another embodiment herein, the touch panel assembly includes a protective substrate and a touch panel disposed on an inner surface of the protective substrate.

According to another embodiment herein, the first end portion and the second end portion of the securing frame are arranged in parallel with each other and the second end portion is closer to the touch panel than the first end portion.

According to another embodiment herein, the second end portion of the securing frame is connected to the touch panel by a double-sided adhesive tape.

According to another embodiment herein, the touch panel assembly further includes a rim frame disposed on a periphery of the protective substrate.

According to another embodiment herein, the second end portion of the securing frame is connected to the rim frame of the touch panel assembly.

According to another embodiment herein, the second end portion of the securing frame is closer to the touch panel than the first end portion of the securing frame.

According to another embodiment herein, the second end portion of the securing frame is farther away from the touch panel than the first end portion of the securing frame.

According to another embodiment herein, the second end portion of the securing frame is connected to the rim frame by a double-sided adhesive tape or a screw.

According to another embodiment herein, the liquid crystal display device further includes a tape adhered to an edge of the liquid crystal panel and the second sidewall of the insulating cover so as to secure the liquid crystal display to the insulating cover.

According to another embodiment herein, the securing frame is a metal frame.

According to another embodiment herein, the first end portion of the securing frame is fixed to the lower surface of the supporting plate by a double-sided adhesive tape.

According to another embodiment herein, the insulating cover is made by foamed Polyethylene terephthalate (PET) or plastic materials.

According an aspect of the present invention, a liquid crystal display device includes a backlight module, a liquid crystal display panel, an insulating cover, a touch panel assembly and a securing frame. The insulating cover includes a reflective bottom plate, at least one first sidewall, at least one second sidewall and a supporting plate. The reflective bottom plate supports the backlight module. The first sidewall has a first end connected with a periphery of the reflective bottom plate and an opposite second end, and the first sidewall is perpendicular to the reflective bottom plate. The second sidewall has a third end and an opposite fourth end, and the second sidewall is perpendicular to the supporting plate. The supporting plate is interconnected between the opposite second end of the first sidewall and the third end of the second sidewall. The supporting plate is arranged in parallel with the reflective bottom plate and has an upper surface for supporting the liquid crystal display panel. The touch panel assembly covers and is disposed above the liquid crystal display panel. The securing frame has a receiving space and a top plate. The receiving space covers a lower surface and a side surface of the insulating cover and the top plate is connected to the touch panel assembly.

According to another embodiment herein, the touch panel assembly includes a protective substrate and a touch panel disposed on an inner surface of the protective substrate.

According to another embodiment herein, the top plate of the securing frame is arranged in parallel with the reflective bottom plate and extending toward a center of liquid crystal panel.

According to another embodiment herein, the top plate of the securing frame is connected to the touch panel by a double-sided adhesive tape.

According to another embodiment herein, the top plate of the securing frame is arranged in parallel with the reflective bottom plate and extending away from a center of liquid crystal panel.

According to another embodiment herein, the top plate of the securing frame is connected to the touch panel by a double-sided adhesive tape.

According to another embodiment herein, the liquid crystal display device further includes a tape adhered to an edge of the liquid crystal panel and the second sidewall of the insulating cover so as to secure the liquid crystal display to the insulating cover.

According to another embodiment herein, the securing frame is a metal frame.

According to another embodiment herein, the insulating cover is made by foamed Polyethylene terephthalate (PET) or plastic materials.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DESCRIPTION OF THE EMBODIMENTS

Figure 1:
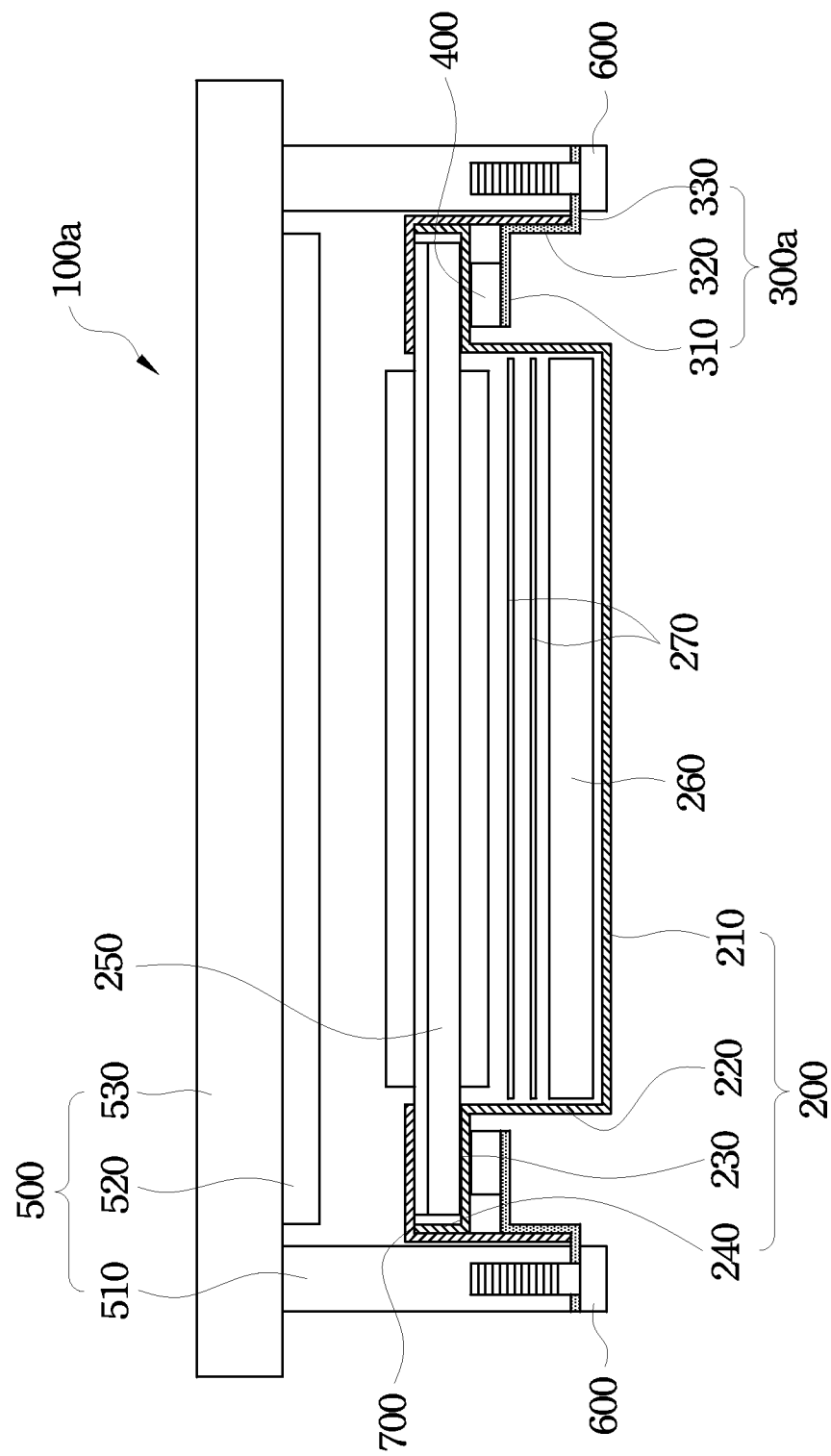
FIG. 1 is a cross-sectional view of a liquid crystal display device equipped with a touch panel assembly according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of a liquid crystal display device equipped with a touch panel assembly according to a first embodiment of the present invention. The liquid crystal display device 100a includes a touch panel assembly 500, an insulating cover 200, a securing frame 300a and a liquid crystal display panel 250. The insulating cover 200 supports the liquid crystal display panel 250 and connects to the securing frame 300a at peripheral edges thereof. The touch panel assembly 500 is secured to securing frame 300a, i.e., the touch panel assembly 500 is arranged above and covers the liquid crystal display panel 250, so as to achieve the liquid crystal display device 100a.

The touch panel assembly 500 includes a touch panel 520, a protective substrate 530 and a rim frame 510. The touch panel 520 is located on an inner surface of the protective substrate 530 so that users can manipulate the touch panel 520 from an opposite outer surface of the protective substrate 530. The rim frame 510 is located on the periphery of the protective substrate 530 and is secured thereto using a plurality of screws (not shown) in suitable positions.

The insulating cover 200 is formed as a unitary piece of foamed polyethylene terephthalate (PET) or other suitable plastic materials by using thermal pressing and cutting processes. The insulating cover 200 is white and has electrical insulating properties. From the cross-sectional view, the insulating cover 200 includes a reflective bottom plate 210, first sidewalls 220, supporting plates 230 and second sidewalls 240.

The reflective bottom plate 210 can serve as a reflector due to superior reflectivity of the foamed polyethylene terephthalate so as to replace a traditional reflector, such that the elements of the liquid crystal display device are reduced and easy assembled. At least one first sidewall 220 extends from a periphery of the reflective bottom plate 210 and is arranged generally perpendicular to the reflective bottom plate 210. The quantity of the first sidewall 220 depends on the design of a backlight source. For example, in the case where a single side-edge type light source is used, it is necessary to use a configuration in which three first sidewalls 220 are located on three sides of the reflective bottom plate 210 and the remaining side is left without a sidewall for receiving light from the side-edge type light source. Alternatively, when two side-edge type light sources are used, it is necessary to use a configuration in which two first sidewalls 220 are located on two sides of the reflective bottom plate 210 and the remaining two sides are left without sidewalls for receiving light from the two side-edge type light sources.

A top end of the first sidewall 220 connects to the supporting plate 230, which is arranged in parallel with the reflective bottom plate 210, and a bottom end of the first sidewall 220 connects to the reflective bottom plate 210. The supporting plate 230 extends outward from one end thereof which is connected with the first sidewall 220 for supporting the liquid crystal display panel 250. Another end of the supporting plate 230 is connected to the second sidewall 240 which is arranged substantially perpendicular to the supporting plate 230.

The reflective bottom plate 210 supports a backlight module, which includes a light guide plate 260, at least one optical film and a light source (not shown in the drawings). The light source is a side-edge type light source located on one or more sides of the light guide plate 260. The light guide plate 260 directs the light produced by the light source towards the liquid crystal display panel 250. The optical film(s) may include a brightness enhanced film or a diffusing film, etc. The light guide plate 260 and at least one optical film are arranged over the reflective bottom plate 210 in sequence and the liquid crystal display panel 250 is located above the supporting plate 230.

The securing frame 300a is made of materials with a mechanical strength greater than the mechanical strength of the insulating cover 200. The securing frame 300a includes an adhesion plate 310, a fixing plate 330 and a third sidewall 320. The third sidewall 320 is interconnected between the adhesion plate 310 and fixing plate 330. The adhesion plate 310 is a first end of the securing frame 300a and is located underneath the supporting plate 230 of the insulating cover 200. The third sidewall 320 is arranged substantially perpendicular to the adhesion plate 310 and the fixing plate 330, and its top end is connected to the adhesion plate 310 and its bottom end is connected to the fixing plate 330. The fixing plate 330 is a second end of the securing frame 300a. From the cross-sectional view, the securing frame 300a is formed in a step-shaped design. An upper surface of the adhesion plate 310 is adhered to a lower surface of the supporting plate 230 by an adhesive element 400, e.g., a double-sided adhesive tape.

In this embodiment, the first end, i.e., the adhesion plate 310, of the securing frame 300a is closer to the touch panel 520 than the second end, i.e., the fixing plate 330, of the securing frame 300a, and the second end of the securing frame 300a is farther away from a center of the liquid crystal display panel 250 than the first end of the securing frame 300a. The fixing plate 330 extends outward from the third sidewall 320 and the adhesion plate 310 extends towards the center of the liquid crystal display panel 250 from the third sidewall 320.

A coupling element 600, e.g., a screw, penetrates through a through hole in the fixing plate 330, and fastens the fixing plate 330 to the rim frame 510 of the touch panel assembly 500. In an alternate embodiment, the coupling element 600 may be a double-sided adhesive tape to adhere the second end of the securing frame 300a to the rim frame 510. In order to enhance the strength of the liquid crystal display device 100a, a tape 700 is adhered to an edge of the liquid crystal display panel 250 and the second sidewall 240 of the insulating cover 200. The tape 700 is adhered from the edge of top surface of liquid crystal display panel 250 to outer surface of the second sidewall 240. In this embodiment, the tape 700 is further adhered to outer surface of the third sidewall 320 so as to firmly secure the liquid crystal display panel 250 to the insulating cover 200 and to the securing frame 300a.

In sum, the liquid crystal display device 100a disclosed herein is lighter and thinner than traditional liquid crystal display devices. Since the insulating cover 200 is a unitary piece, several assembly steps can be omitted.

Figure 2:
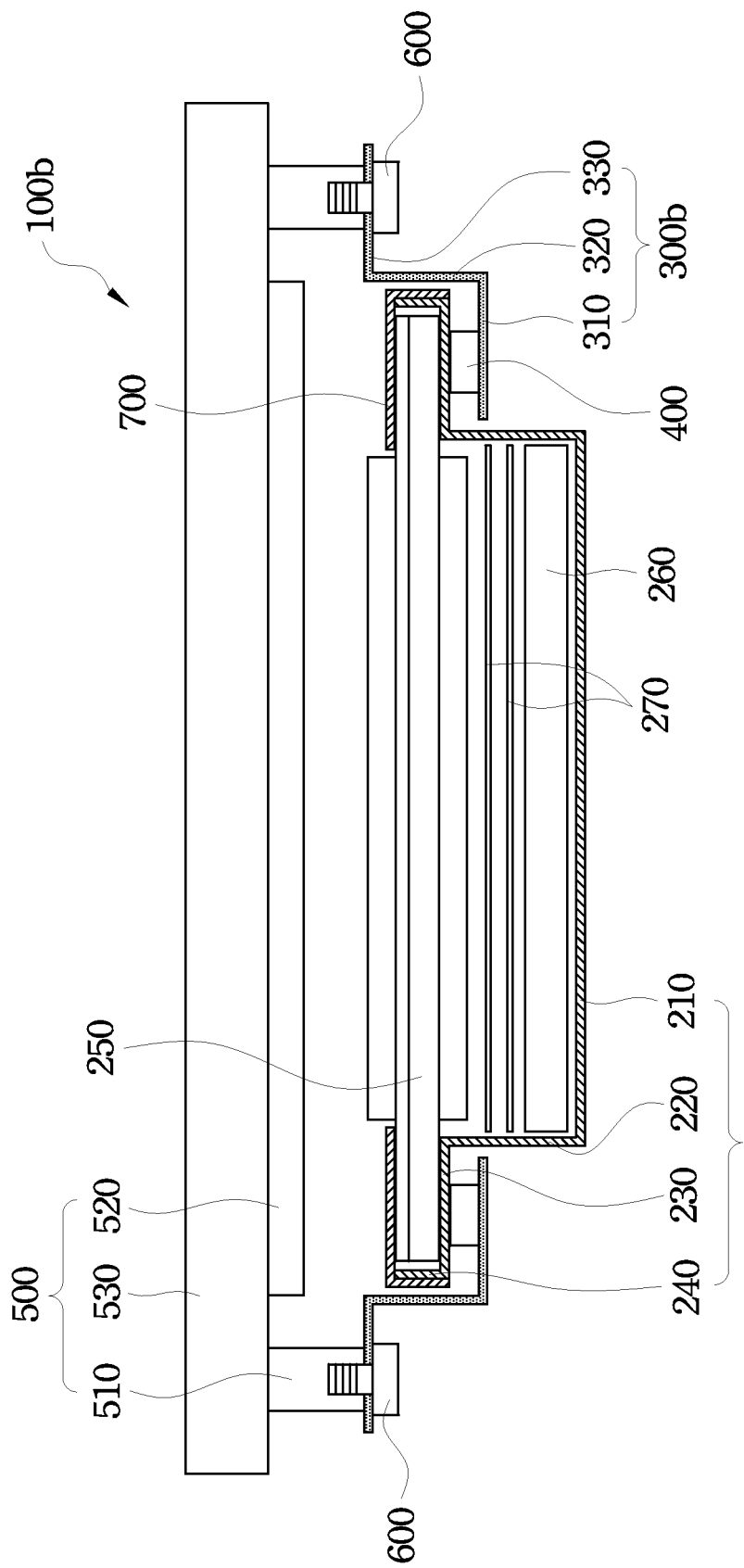
FIG. 2 is a cross-sectional view of a liquid crystal display device equipped with a touch panel assembly according to a second embodiment of the present invention.

FIG. 2 is a cross-sectional view of a liquid crystal display device equipped with a touch panel assembly according to a second embodiment of the present invention. The liquid crystal display device 100b includes a touch panel assembly 500, an insulating cover 200, a securing frame 300b and a liquid crystal display panel 250. The liquid crystal display device 100b differs from the liquid crystal display device 100a in the design of the securing frame 300b.

The securing frame 300b of this embodiment also has a step-shaped design. In this embodiment, the second end, i.e., the fixing plate 330, of the securing frame 300b is closer to the touch panel 520 than the first end, i.e., the adhesion plate 310, of the securing frame 300b, and the second end of the securing frame 300b is farther away from a center of the touch panel frame 520 than the first end of the securing frame 300b. A top end of the third sidewall 320 is connected to the fixing plate 330 and a bottom end of the third sidewall 320 is connected to the adhesion plate 310. The fixing plate 330 extends outward from the third sidewall 320, and the adhesion plate 310 extends towards the center of the liquid crystal display panel 250 from the third sidewall 320. In this embodiment, the rim frame 510 is reduced in thickness (compared with the embodiment illustrated in FIG. 1) so as to achieve a thinner liquid crystal display device by reducing the thickness at the periphery thereof.

Figure 3:
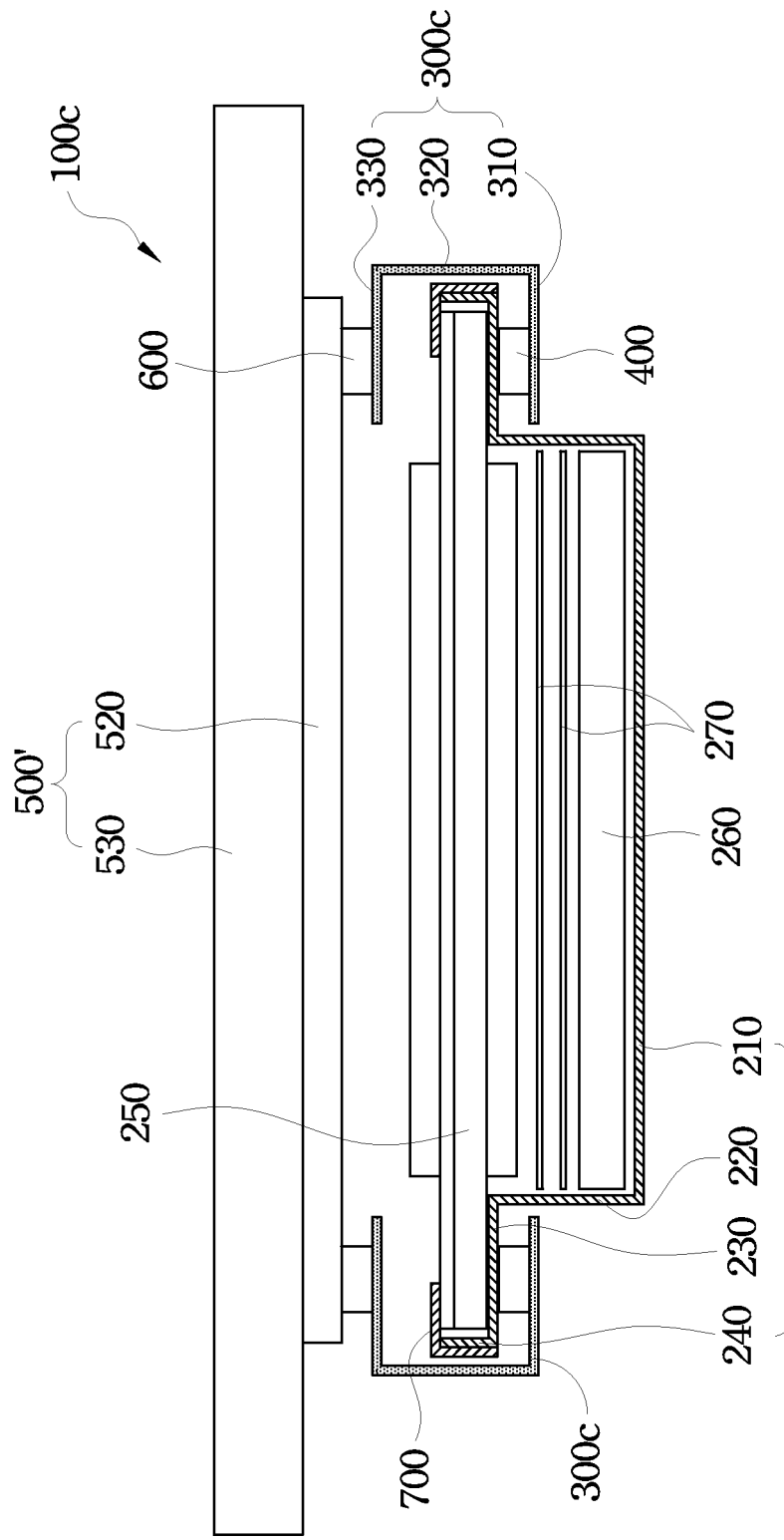
FIG. 3 is a cross-sectional view of a liquid crystal display device equipped with a touch panel assembly according to a third embodiment of the present invention.

FIG. 3 is a cross-sectional view of a liquid crystal display device equipped with a touch panel assembly according to a third embodiment of the present invention.

The liquid crystal display device 100c includes a touch panel assembly 500', an insulating cover 200, a securing frame 300c and a liquid crystal display panel 250. The liquid crystal display device 100c differs from the liquid crystal display devices 100a and 100b in the design of the securing frame 300c and the touch panel assembly 500'.

The touch panel 520 is located on the inner surface of the protective substrate 530 so that users can manipulate the touch panel 520 from an outer surface opposite to the inner surface of the protective substrate 530. The rim frame 510 (referring to FIG. 1 and FIG. 2) is omitted in the configuration of the touch panel assembly 500'.

The adhesion plate 310 of the securing frame 300c is arranged in parallel with the fixing plate 330. The adhesion plate 310 extends towards the center of the liquid crystal display panel 250 from a bottom end of the third sidewall 320, and the fixing plate 330 extends towards the center of the liquid crystal display panel 250 from a top end of the third sidewall 320. The securing frame 300c has a U-shaped cross-sectional configuration. The adhesion plate 310 of the securing frame 300c is adhered to a lower surface of the supporting plate 230 of the insulating cover 200 by an adhesive element 400, e.g., a double-side adhesive tape. The fixing plate 330 is connected to a periphery of a bottom surface of the touch panel 520 also by a coupling element 600, e.g., a double-sided adhesive tape, instead of a screw, bolt or other fastener so as to achieve a thinner profile for the liquid crystal display panel assembly 100c.

Figure 4:
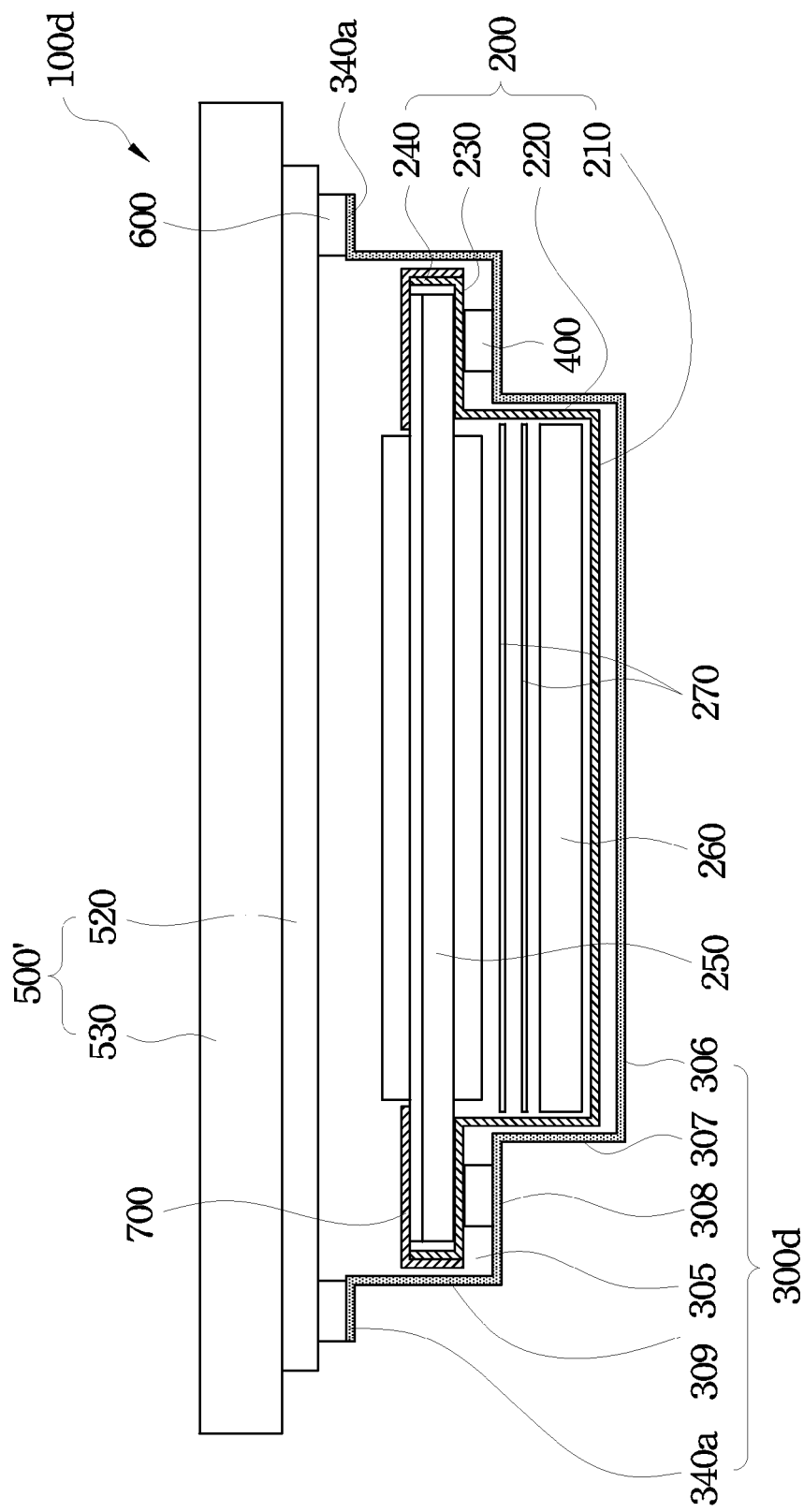
FIG. 4 is a cross-sectional view of a liquid crystal display device equipped with a touch panel assembly according to a fourth embodiment of the present invention.

FIG. 4 is a cross-sectional view of a liquid crystal display device equipped with a touch panel assembly according to a fourth embodiment of the present invention. The liquid crystal display device 100d includes a touch panel assembly 500', an insulating cover 200, a securing frame 300d, and a liquid crystal display panel 250.

There is a receiving space 305 formed within the securing frame 300d conformal to an outer profile of the insulating cover 200. The securing frame 300d includes a bottom portion 306, a sidewall 307, a horizontal plate 308, a vertical plate 309 and a top plate 340a. A bottom end of the sidewall 307 is connected to the bottom portion 306 and the opposite top end of the sidewall 307 is connected to one end of the horizontal plate 308. Another end of the horizontal plate 308 is connected to a bottom end of the vertical plate 309. Another top end of the vertical plate 309 is connected to the top plate 340a. The receiving space 305 can fully wrap around the bottom surface and side surfaces of the insulating cover 200 so that the bottom portion 306 faces the bottom surface of the insulating cover 200 and the sidewall 307 faces the side surface of the insulating cover 200. The top plate 340a extends outward away from the center of the liquid crystal display panel 250. When the insulating cover 200 is assembled inside the securing frame 300d, the reflective bottom plate 210 of the insulating cover 200 is located adjacent to the bottom portion 306 of the securing frame 300d and the securing frame 300d entirely wraps around the bottom and side surfaces of the insulating cover 200.

An inner surface of the horizontal plate 308 is adhered to a bottom surface of the insulating cover 200 by an adhesive element 400, e.g., a double-sided adhesive tape. The top plate 340a of the securing frame 300d is adhered to a periphery of a bottom surface of the touch panel 520 by a coupling element 600, e.g., a double-sided adhesive tape. With this configuration, the liquid crystal display device 100d not only has a thin and light appearance but also possesses a high degree of mechanical strength.

Figure 5:
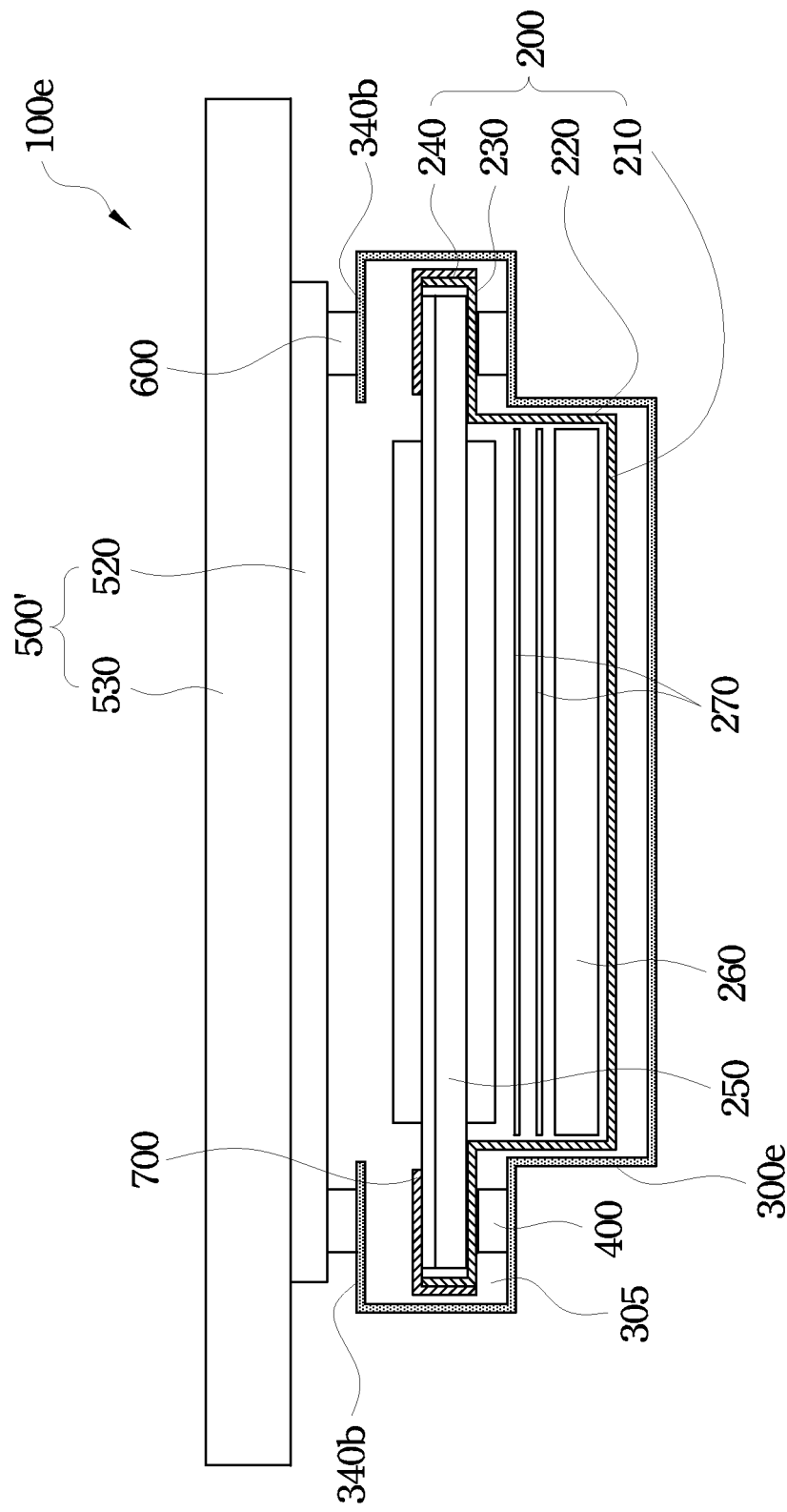
FIG. 5 is a cross-sectional view of a liquid crystal display device equipped with a touch panel assembly according to a fifth embodiment of the present invention.
Figure 6:
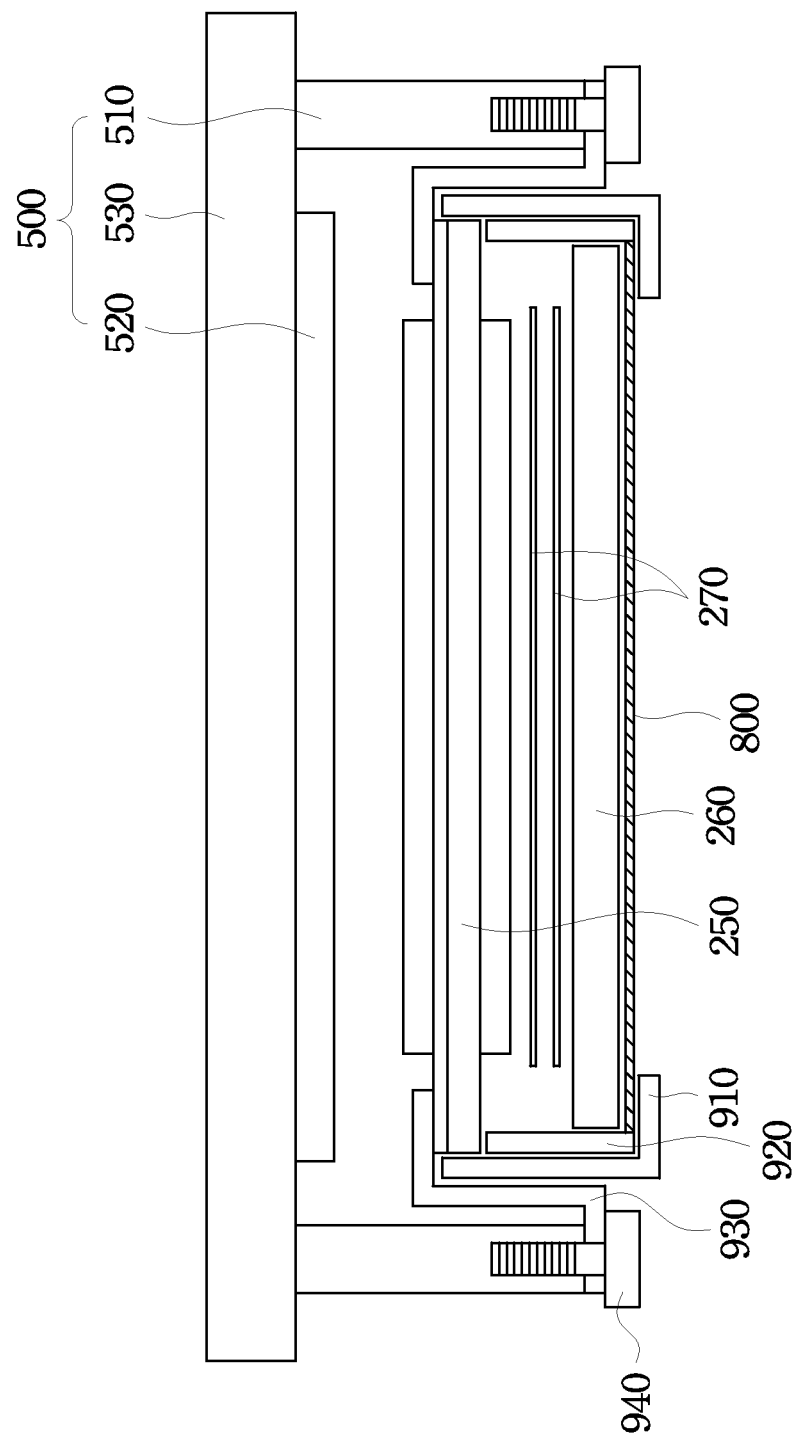
FIG. 6 is a cross-sectional view of a conventional liquid crystal display device equipped with a touch panel assembly.

FIG. 5 is a cross-sectional view of a liquid crystal display device equipped with a touch panel assembly according to a fifth embodiment of the present invention.

The liquid crystal display device 100e includes a touch panel assembly 500', an insulating cover 200, a securing frame 300e and a liquid crystal display panel 250. The liquid crystal display device 100e differs from the liquid crystal display device 100d in the design of a top plate 340b of the securing frame 300e. The top plate 340b of the securing frame 300e extends towards the center of the liquid crystal display panel 250.

According to the discussed embodiments, a new solution is provided to assemble the touch panel assembly and the liquid crystal display module by utilizing an insulating cover of a single unitary piece. Therefore, the liquid crystal display device of the present invention is thinner and lighter, and requires fewer manufacturing steps in the assembly process when compared to conventional configurations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A liquid crystal display device comprising:
a backlight module;
a liquid crystal display panel;
an insulating cover comprising:
a reflective bottom plate for supporting the backlight module thereon;
at least one first sidewall having a first end connected with a periphery of the reflective bottom plate and an opposite second end, the first sidewall being perpendicular to the reflective bottom plate;
at least one second sidewall having a third end and an opposite fourth end, the second sidewall being perpendicular to the reflective bottom plate; and
a supporting plate being interconnected between the opposite second end of the first sidewall and the third end of the second sidewall, and the supporting plate being in parallel with the reflective bottom plate and having an upper surface for supporting the liquid crystal display panel thereon;
a touch panel assembly covering and disposed above the liquid crystal display panel; and
a securing frame having a receiving space for accommodating the insulating cover, having a profile adjoining a lower surface and a side surface of the insulating cover and having a top plate being connected to the touch panel assembly.

2. The display device of claim 1, wherein the touch panel assembly comprises a protective substrate and a touch panel disposed on an inner surface of the protective substrate.

3. The display device of claim 2, wherein the top plate of the securing frame is arranged in parallel with the reflective bottom plate and extending toward to a center of liquid crystal panel.

4. The display device of claim 3, wherein the top plate of the securing frame is connected to the touch panel by a double-sided adhesive tape.

5. The display device of claim 2, wherein the top plate of the securing frame is arranged in parallel with the reflective bottom plate and extending away from a center of liquid crystal panel.

6. The display device of claim 5, wherein the top plate of the securing frame is connected to the touch panel by a double-sided adhesive tape.

7. The display device of claim 1, further comprising a tape adhered to an edge of the liquid crystal panel and the second sidewall of the insulating cover so as to secure the liquid crystal display to the insulating cover.

8. The display device of claim 1, wherein the securing frame is a metal frame.

9. The display device of claim 1, wherein the insulating cover is made by foamed polyethylene terephthalate (PET) or plastic materials.

\* \* \* \* \*